United States Patent [19]

Fenlon

[11] Patent Number: 5,531,101
[45] Date of Patent: Jul. 2, 1996

[54] PACKAGE TESTING

[75] Inventor: Christopher Fenlon, Whitchurch, England

[73] Assignee: Ishida-Nonpareil Limited, Bristol, England

[21] Appl. No.: 295,864
[22] PCT Filed: Mar. 8, 1993
[86] PCT No.: PCT/GB93/00480
 § 371 Date: Dec. 6, 1994
 § 102(e) Date: Dec. 6, 1994
[87] PCT Pub. No.: WO93/18385
 PCT Pub. Date: Sep. 16, 1993

[30] Foreign Application Priority Data

Mar. 7, 1992 [GB] United Kingdom ............... 9205011

[51] Int. Cl.⁶ ............................................ G01M 3/34
[52] U.S. Cl. ........................... 73/49.3; 73/824; 73/842; 73/843
[58] Field of Search ................... 73/49.3, 54.06, 73/824, 842, 843; 33/772

[56] References Cited

U.S. PATENT DOCUMENTS 5,140,166  8/1992  Gerlier ........................... 250/548

*Primary Examiner*—Hezron E. Williams
*Assistant Examiner*—Jay L. Politzer
*Attorney, Agent, or Firm*—Larson and Taylor

[57] ABSTRACT

A package is conveyed to a test station where a friction roller is pressed against the package and urged to rotate relative to the package. The amount of rotation urgeable for a preset torque is indicative of package seal quality. This rotation is automatically detected and compared with a preset value to determine the quality of the package seal.

11 Claims, 3 Drawing Sheets

PACKAGE TESTING

BACKGROUND

This invention relates to a machine and method that may be used for applying a non-destructive test to a package such as a vacuum package, containing, for example, food, chemicals or medicines. This may be to check that the sealing of the package is good, e.g. so that the product within the package cannot escape from the package; nor can the outside atmosphere enter the package. It is particularly applicable to packages having flexible outer layers of plastics films.

A machine of such type is useful, for example, in production lines, where it would be desirable to verify the integrity of the seals of the complete production throughput without destroying the packages or products.

SUMMARY

According to the invention there is provided a apparatus for testing packages comprising:

a test station having support means for supporting a package;

a test probe arranged to be relatively reciprocable towards and away from the support means; said probe having a surface portion which is transversely displaceable;

first urging means for urging relative movement of the probe towards the support means to contact with its displaceable surface portion a package supported at said test station;

second urging means to urge said transverse displacement of said probe surface portion; and means for detecting transverse displacement of the probe surface portion and providing a corresponding output signal; whereby the probe is urgeable by said first urging means to contact a package at the test station with its surface portion, whereupon the ability of the second urging means to displace the probe surface portion is dependent on the nature of he contacted package, so that the output signal of the detecting means is indicative of package quality.

The apparatus may test a stationary package. Dynamic testing is also possible, with packages moving continuously through one or more test stations.

In another aspect the invention provides a method of testing a package comprising applying a test probe to the package; urging transverse displacement of a surface portion of the probe relative to the package while restraining displacement of the package in response thereto; and determining the amount of displacement of the probe surface portion relative to the package and providing a corresponding output signal indicative of package quality.

The force and/or torque applied by the probe may be variable.

In order that the invention may be more clearly understood some embodiments will now be described with reference to the accompanying drawings wherein:

BRIEF DESCRIPTION

DETAILED DESCRIPTION

Figure 1:
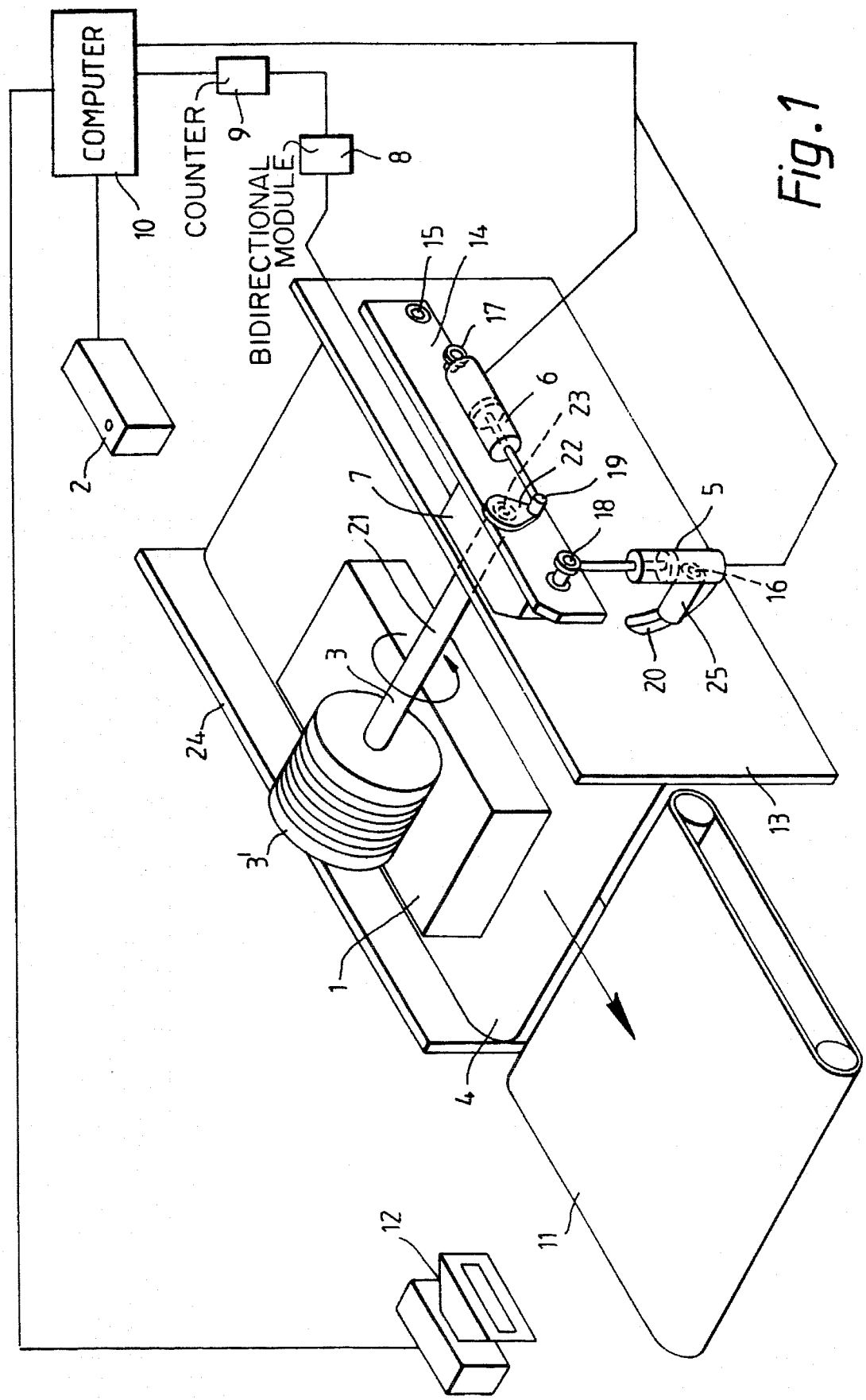
FIG. 1 is a perspective view of a first embodiment.

FIG. 1 shows an automatic conveying and seal integrity testing system having the means to receive a packaged product from an upstream machine, such as a fill and seal machine, via a feed conveyor 4, into a test area. A machine frame comprises side plates 13 adjacent the feed conveyor 4. One side plate 13 carries an arm assembly including a rotatable shaft 3 which is urgeable towards the surface of the conveyor 4 to contact an article, such as a package 1, thereon. The shaft 3 carries a test roller 3' with a high-friction surface. The shaft is rotatably and driveably mounted in a test arm 14 which is displaceable by an actuator 5. It is rotatable by a second actuator 6, as explained below.

The arrival of a package is sensed by a sensor 2 which signals a computer 10 to operate the displacement actuator 5. Actuator 5 operates only after an adequate amount of time has passed to allow the package due to be tested to arrive centrally under the test roller 3'.

The complete test function is automatic, with timed signals being sent to all the actuators, forcing a sequence of operations. For example, conveyor 4, which has a conveyor surface with gripping qualities, stops momentarily when package 1 arrives centrally under test roller 3' to allow the test to be applied. The actuator 5 then pulls test arm 14 downwards, forcing test roller 3' into contact with the top layer of the packaging material of package 1. The gripping qualities enable the conveyor belt fitted to conveyor 4 to hold the package 1 in a fixed position during the test. Rotation actuator 6 pulls test shaft plate 22, forcing test shaft 3 and test roller 3' to turn in an anti-clockwise direction. The amount that test roller 3' is allowed to rotate is determined by the nature of the surface of the package, particularly the seal quality. It is monitored by an incremental encoder 7 whose output is fed through a bi-directional module 8 to a digital input counter 9 which displays the count on its digital display panel.

Prior to a production run, an optimum or ideal package is selected and is fed into the testing station, where a seal test is applied and a reference reading is taken. This reference reading plus a tolerance band determined by the machine user, is keyed into a data access unit of the computer. This then becomes the standard to which all subsequent packages are compared. Production is then allowed to commence with any subsequent package that fails to meet this pre-set standard being rejected.

The reading from each and every test is compared to the preset standard. Any package 1 that is found to be within the preset standard is allowed to continue through to the next in-line machine via the outfeed conveyor 11. Any package 1 failing to meet the preset standard is rejected from the line by reject mechanism 12. The reject mechanism 12 shown is an air jet, but could be a mechanical, electrical or pneumatic actuator.

The amount of rotation that test roller 3 achieves during testing of the package 1 is determined by the resistance offered by the package 1 being tested. A package with good seals offers a greater resistance than a package with leaking seals. Also, packages with good seals tend to offer a consistent level of resistance from package to package, whereas a package with bad seals tends to offer considerably less resistance and therefore produces a greater reading than the pre-set standard.

The displacement actuator 5 is fitted to conveyor side 13 and to test arm 14 in such a way, via pivot points 16 and 18, as to allow it to pivot during operation.

The rotation actuator 6 is fitted to test arm 14 and test roller shaft plate 22 in such a way, via pivot points 17 and 19, as to allow it to pivot during operation.

Test roller shaft 3 may be mounted via a one way bearing 23. This ensures that test roller shaft 3 will only rotate in an anti-clockwise direction against the flow of packages 1.

Test arm 14 is fitted to conveyor side 13 in such a way, via pivot point 15, as to allow it to pivot during operation.

Test roller 3 has a surface with a multiplicity of grooves, and has a high-friction coating applied by means of a rubber solution. Thus it offers a high level of grip to the packaging material used in package 1.

Test roller 3' is fitted and locked onto shaft 3 which is fitted through incremental encoder 7 to one way bearing 23.

Shaft 3' may be free running in one direction only, as allowed by one way bearing 23.

The height that test roller 3' is set above conveyor 4 can be varied by adjusting the position of pivot point pillar 25, via a slot 20 in the conveyor side 13. This allows a wide range of heights of packages 1 to be tested, for example, at the lowest adjustment a flat package of "D" shaped ham with a package height of less than 3 mm can be tested. At the highest adjustment a package such as a cheese block with a height of 90 mm or greater can be tested. This is a manual method of adjustment; however, it could easily be made automatic by fitting an actuator to raise and lower the pivot point pillar 25.

Figure 2:
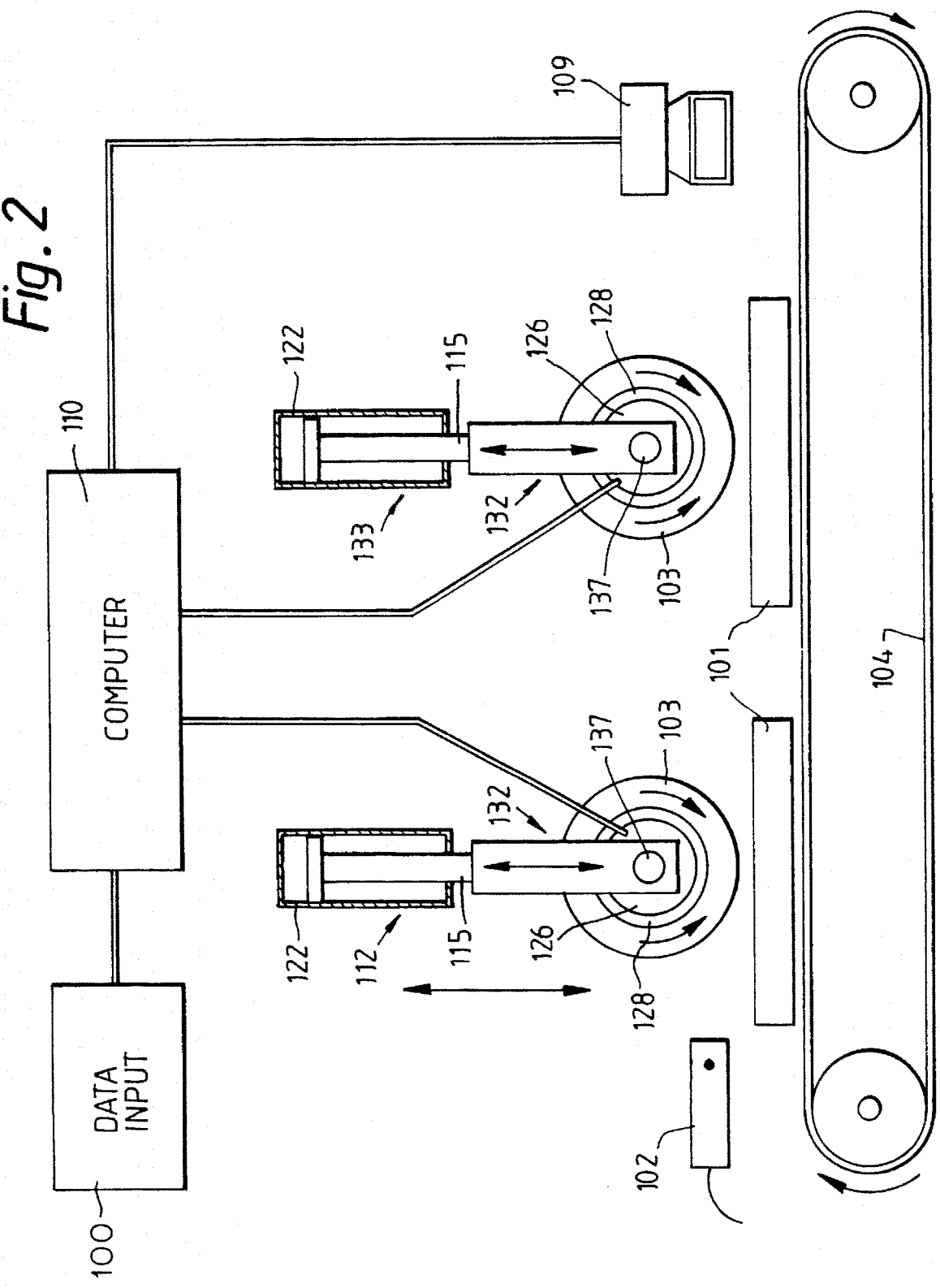
FIG. 2 is a schematic side view of a second embodiment having two test stations.
Figure 3:
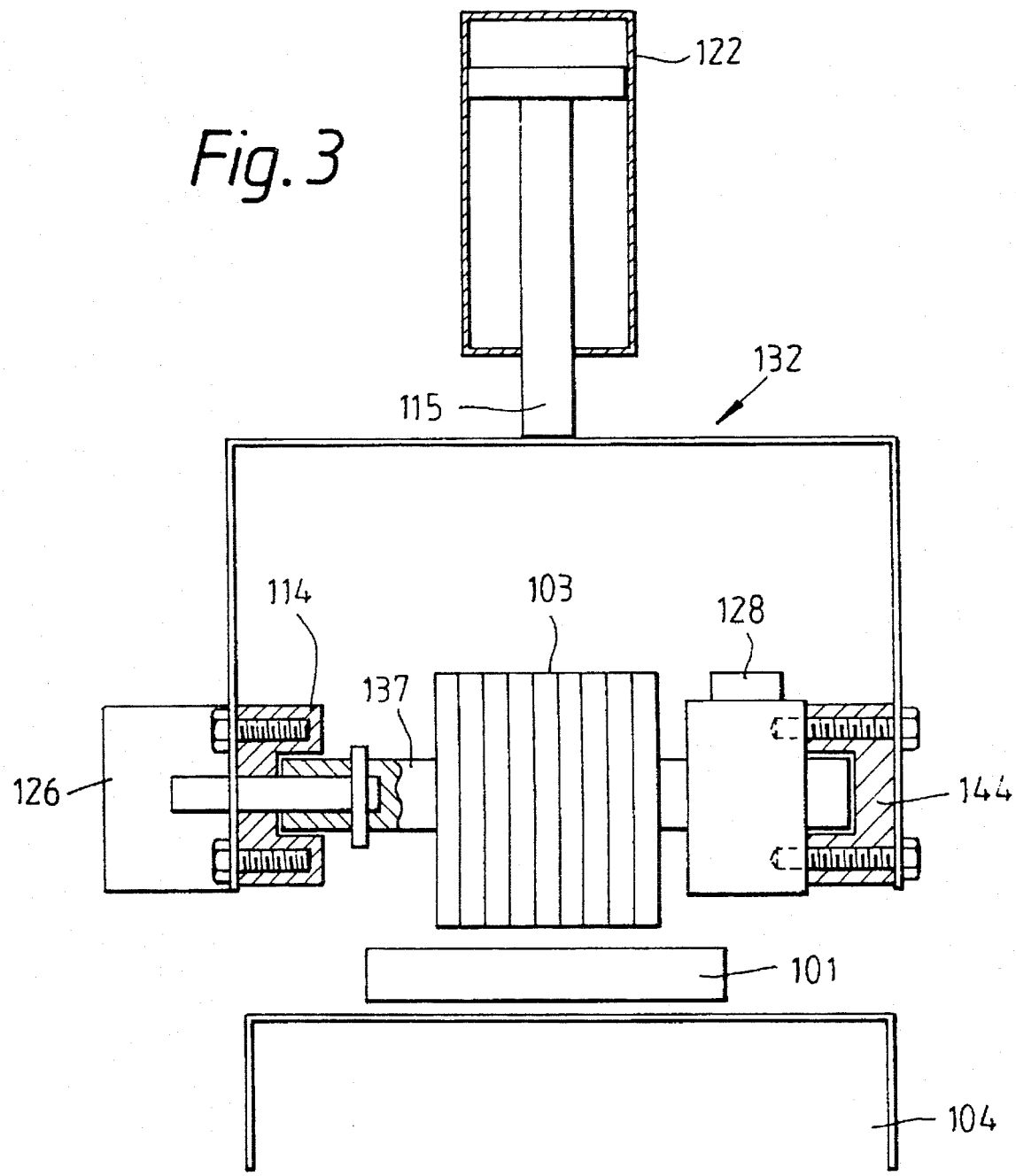
FIG. 3 is a front view of a test station of the second embodiment.

FIGS. 2 and 3 show a second embodiment having a multiplicity (in this example two) of testing stations. The testing stations are arranged to apply tests to moving products 101 carried on a conveyor 104.

Generally as described with reference to FIG. 1, there are a data access unit 100 linked to a computer 110 having the means to set a preset standard of quality of seal to a packaged product that all subsequently tested packages have to be within, and means to receive a packaged product 101 from an upstream machine, such as a fill and seal machine, not shown, via a feed conveyor 104. The arrival of the package at the first roller assembly test station 112 is sensed by a sensor 102. This signals computer 110 to operate an actuator 122 to move a roller assembly 132 downwards to arrive onto package 101. The amount of pressure applied by roller assembly 132 during the test can be altered and preset to suit the type of packaged product being tested. When roller 103 (which has a high grip surface, for example rubber) comes into contact with a package 101, the roller 103 will be forced to rotate by product 101 as it is conveyed beneath it by conveyor 104. The amount of rotation of roller 103 is monitored by encoder 128. At a predetermined position, for example, when the package 101 has arrived centrally beneath test roller 103, a valve or actuator 126 is made to operate by computer 110 to force roller 103 to turn in a clockwise direction against the direction of flow of package 101. If a package 101 has a good seal, it will overcome the level of force being applied by actuator 126 via roller 103. The resulting reading of the test by encoder 128 will be a reading that matches or is within the preset standard. This package 101 may at this point, without further testing, be regarded as a package with a good seal or a further seal test may be applied at a further test station 133, using the same method of testing as at the first test station 112. The result is compared by the computer 110 with the test applied by the first test station 112. This dual test will also be compared against the preset standard. If the resulting reading shows that the package 101 is within the preset standard and that the comparison between the tests at the two test stations shows that the results are the same, or differ by less than a preset difference band value, the package will be allowed through to the next in-line machine for the next stage of the production and packaging process.

However, if package 101 has a bad or leaking seal at the first test station 112 the force being applied by actuator 126 and roller 103 will not be resisted by the package. A shear action will occur between the top and bottom films of package 101. The resulting reading of the test by encoder 128 will be a reading that is outside the preset standard. This package 101 may at this point, without further testing be regarded as a package with a bad seal or a further seal test may be applied at the second test station 133 and compared with the test applied by the first test station 122. This dual test will also be compared against the preset standard. If the resulting readings show that package 101 is outside the preset standard or that the comparison between the tests at test stations 112 and 133 are significantly different, then package 101 will be rejected by reject means such as, for example, air jet 109.

Actuator 122 is fixed to a supporting non moving frame, not shown. The first test station 122 has a piston/cylinder assembly with a piston 115 to which the roller assembly 132 is mounted so as to allow it to be lowered by the downward stroke of actuator 122 onto a package, and also removed back to the starting position by the back stroke of actuator 122. Shaft 137 passes through roller 103 and encoder 138 and is supported both ends by bearing block 144.

Test roller 103 is keyed to shaft 137. Encoder 128 is keyed to shaft 137. The linear measuring device of encoder 128 is allowed to rotate with roller 103 in either direction. The housing of encoder 128 is fixed to bearing block 144, which is fixed in the test station 122. The outer casing of drive means 126 which for example could be a motor or a rotary actuator is fixed to bearing block 144 allowing the inner drive which is keyed to shaft 137 to rotate in any direction.

The second test station 133 and any other test stations are mounted and assembled in the same way as described above. All of the test stations are mounted independently of each other.

What is claimed is:

1. Apparatus for testing packages comprising:

a test station having support means for supporting a package;

a test probe arranged to be relatively reciprocable towards and away from the support means;

said probe having a surface portion which is transversely displaceable first urging means for urging relative movement of the probe towards the support means to cause said transversely displaceable surface portion to contact a package supported at said test station;

second urging means to urge said transverse displacement of said probe surface portion; and means for detecting transverse displacement of the probe surface portion and providing a corresponding output signal; said probe being urgeable by said first urging means to contact a package at the test station with said transversely displaceable surface portion, whereupon the ability of the second urging means to displace said transversely displaceable surface portion is dependent on the nature of the contacted package, so that the output signal of the detecting means is indicative of package quality.

2. Apparatus according to claim 1 wherein said transversely displaceable test probe surface portion comprises a rotary element.

3. Apparatus according to claim 1 wherein the support means and the transversely displaceable probe surface portion have grip surfaces adapted to engage a package with high friction.

4. Apparatus according to claim 1 including conveyor means for conveying packages to and from the test station.

5. Apparatus according to claim 4 wherein the conveyor means has a displaceable support surface which also provides said support means.

6. Apparatus according to claim 4 arranged to test a package while it is being conveyed by the conveyor means.

7. Apparatus according to claim 1 further comprising computer means arranged to receive the output signal of the detecting means and compare it with a preset value or range.

8. Apparatus according to claim 7 further comprising package rejecting means arranged to be actuable by said computer means in response to a comparison.

9. Apparatus according to claim 1 having a plurality of test stations, each having a respective associated test probe, first and second urging means, and displacement detecting means.

10. Apparatus according to claim 1 wherein the first urging means is adjustable to allow for different package thickness.

11. A method of testing a package comprising applying a surface portion of a test probe to a package; urging transverse displacement of the surface portion of the probe relative to the package while restraining displacement of the package in response thereto; determining the amount of displacement of the probe surface portion relative to the package; and providing an output signal corresponding to the amount of displacement and indicative of package quality.

* * * * *